Figure 1:
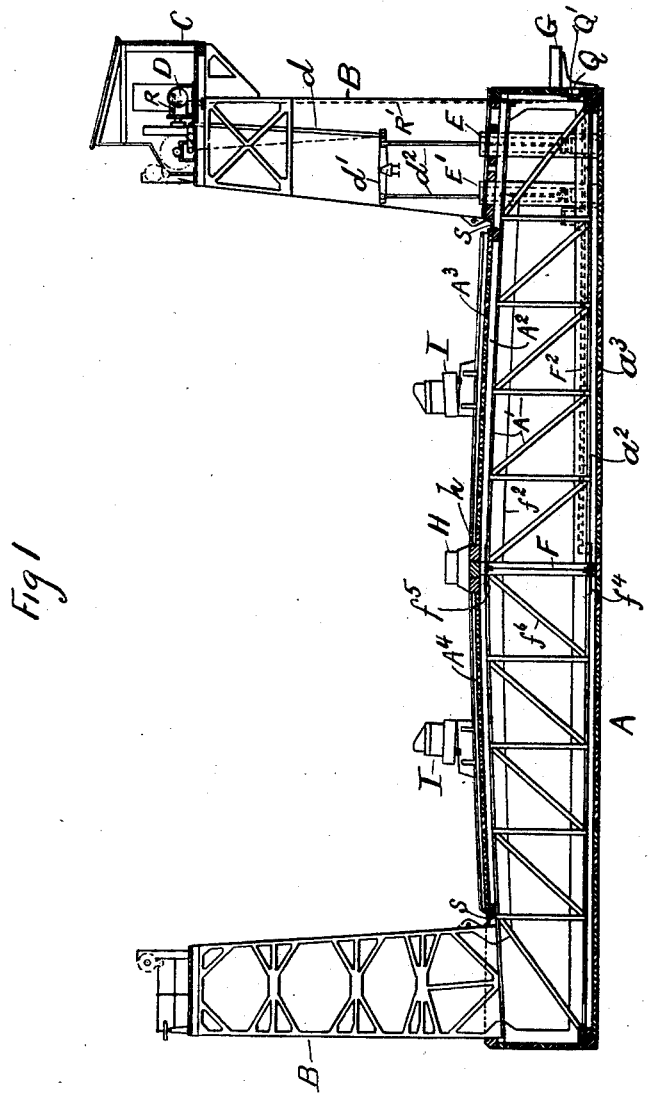

No. 713,947. Patented Nov. 18, 1902.
G. A. BRONDER.
FLOATING DRY DOCK.
(Application filed May 6, 1901.)

(No Model.) 5 Sheets—Sheet 1.

Witnesses
Inventor
Gaston A. Bronder
By his Attorney

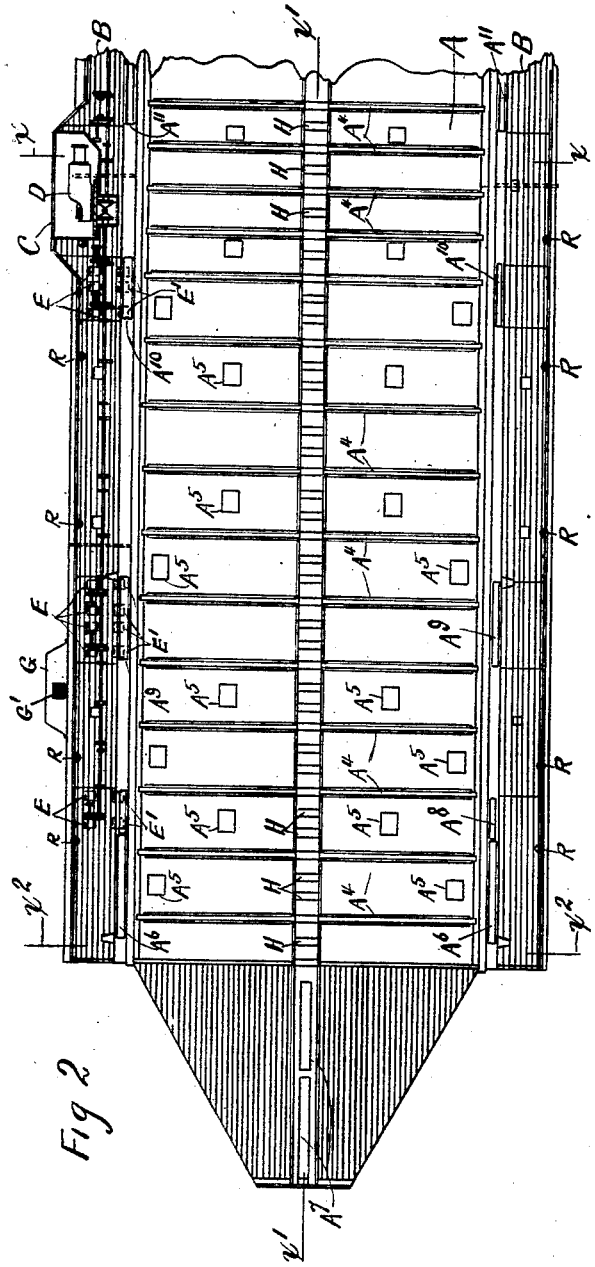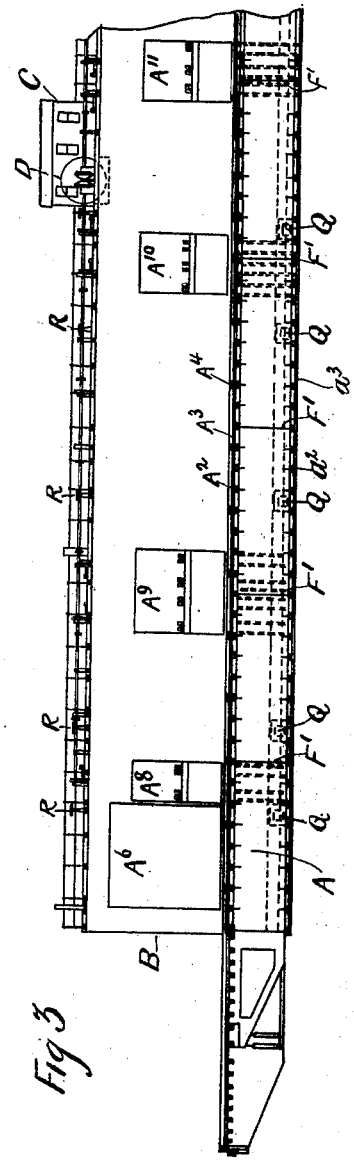

No. 713,947. Patented Nov. 18, 1902.
G. A. BRONDER.
FLOATING DRY DOCK.
(Application filed May 6, 1901.)
(No Model.) 5 Sheets—Sheet 3.
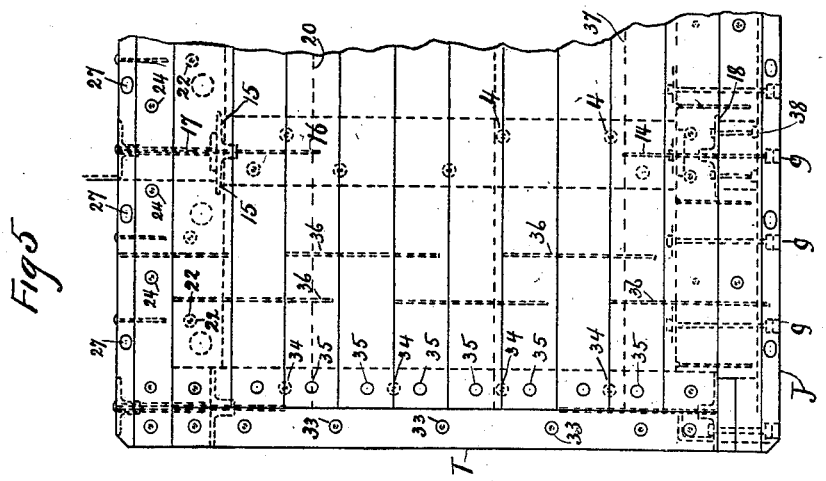
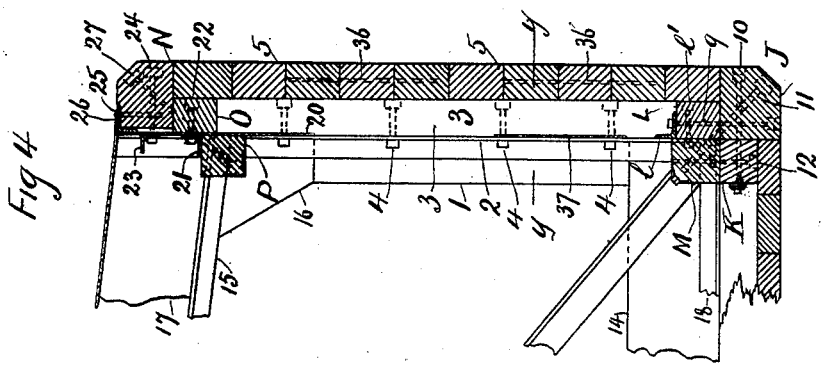
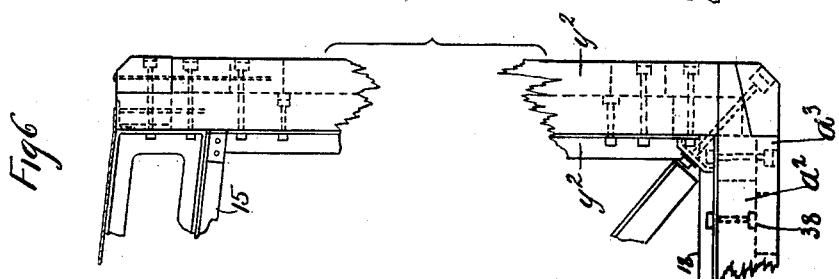
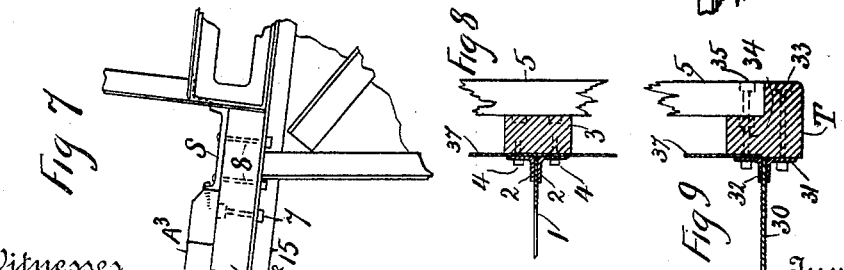
Witnesses
Walter B. Pierson
William P. Franc
Inventor
Gaston A. Bronder
By his Attorney
A. N. de Bonneville

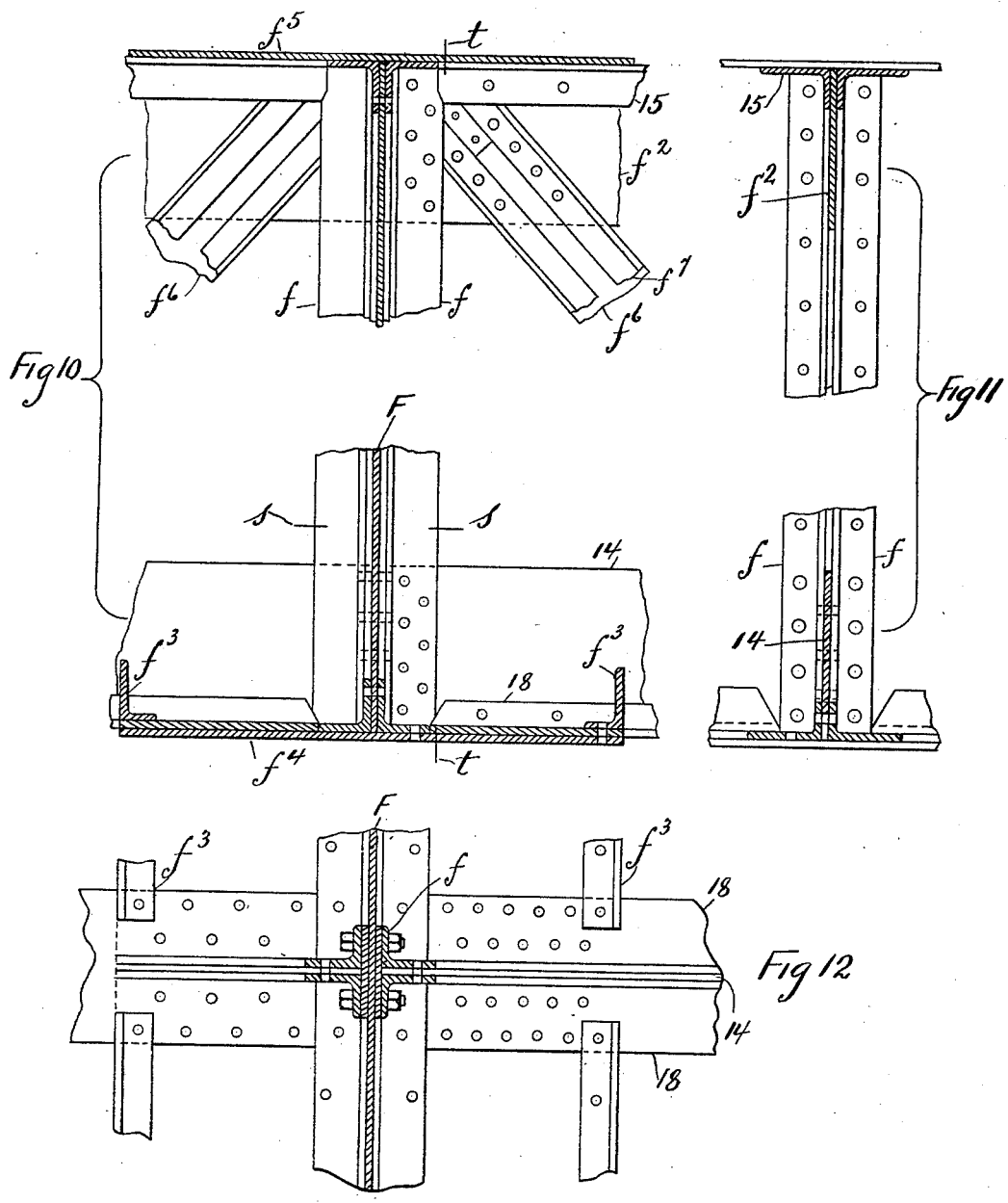

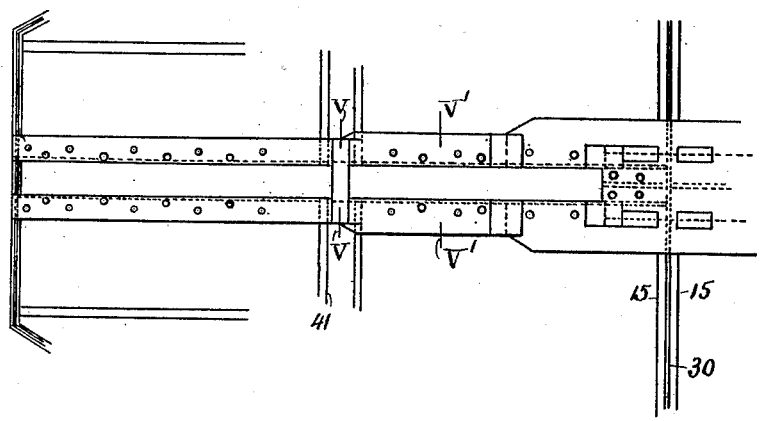
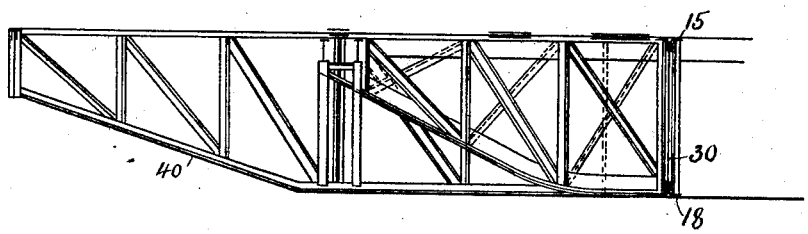
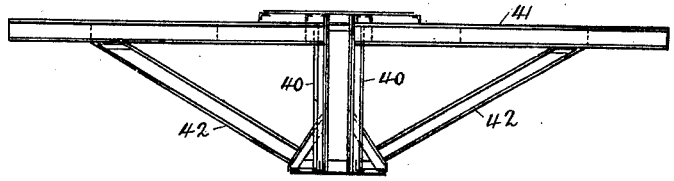
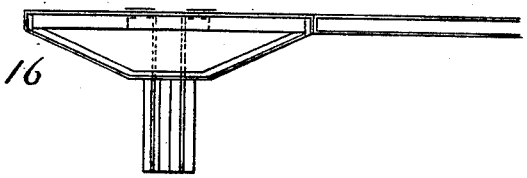
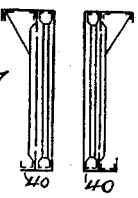

UNITED STATES PATENT OFFICE.

GASTON A. BRONDER, OF BROOKLYN, NEW YORK.

FLOATING DRY-DOCK.

SPECIFICATION forming part of Letters Patent No. 713,947, dated November 18, 1902.

Application filed May 6, 1901. Serial No. 58,934. (No model.)

*To all whom it may concern:*

Be it known that I, GASTON A. BRONDER, a citizen of the United States, and a resident of the borough of Brooklyn, in the county of Kings and State of New York, have invented certain new and useful Improvements in Floating Dry-Docks, of which the following is a specification.

This invention relates to floating dry-docks of composite construction, comprising steel, iron, and wood. Its object is the production of a floating dry-dock which combines the strength of an iron and steel structure with the advantages of wooden planking, and among its novel features may be mentioned the method employed of fastening the wooden stringers and girders to the iron and steel frames, the longitudinal bulkhead consisting of a riveted plate-girder with its top and bottom reinforcing-plates, steel outriggers projecting from the ends of the pontoon, and the iron gutters at the sides of the deck-planking of the pontoon.

Figure 1 represents a vertical cross-section of the dock on the line $x\ x$ of Fig. 2. Fig. 2 shows a fragmentary top plan view of the dock. Fig. 3 is a sectional elevation of the dock on the line $x'\ x'$ of Fig. 2. Fig. 4 represents a section through one side of the pontoon on the line $x^2\ x^2$ of Fig. 2. Fig. 5 is a side view of Fig. 4. Fig. 6 shows a fragmentary end view of a side of the pontoon. Fig. 7 represents a fragmentary end view of the pontoon, showing the location of the gutter. Fig. 8 is a section on line $y\ y$ of Fig. 4. Fig. 9 shows a section on the line $y^2\ y^2$ of Fig. 6. Fig. 10 represents a vertical cross-section through the central longitudinal bulkhead. Fig. 11 is a section on line $t\ t$ of Fig. 10. Fig. 12 shows a section on line $s\ s$ of Fig. 10. Fig. 13 represents a top view of the framing of the outriggers. Fig. 14 is an elevation of Fig. 13. Fig. 15 shows a section on the line V V of Fig. 13. Fig. 16 is a partial end view of Fig. 14. Fig. 17 represents a section of Fig. 13 on the line V' V'.

Referring to Figs. 1, 2, and 3, the dock is shown to consist of the pontoon A, with towers B, engine-house C, with engine D and its appurtenances to operate the pumps E and E' opposite the several compartments which are formed by the cross-bulkheads F' F', &c., and the longitudinal bulkhead F. The pumps E operate on the compartments on the right of the longitudinal bulkhead F and the pumps E' on the left of the same through the sluices $F^2$. The pumps are operated by the engine D through the pitmen $d$, balance-beams $d'$, and plunger-rods $d^2$. Inlet-openings are shown at Q, with their flooding-valves Q', operated by the rods R' with hand-wheels R. At G are shown guiding-shelves for the spiles G'. On top of the cross-frames A' are bolted wooden stringers $A^2$, to which are spiked the deck-planks $A^3$, which carry the bilge-block guides $A^4$ for the movable bilge-blocks I I, the said guides extending from the gutters S S to the keel-blocks H, the latter resting on the fore-and-aft stringers $h$.

To the bottom of the cross-frames A' are bolted the wooden stringers $a^2$, to which is spiked the bottom planking $a^3$. Hatches are shown at $A^5$ and ventilating-openings at $A^6$ and $A^8$ to $A^{11}$. The openings $A^7$ in the outriggers are provided for shipping and unshipping rudders.

Referring to Figs. 4 to 9, the sides of the steel cross-frames consist of the plates 1, to which are riveted the angles 2 and the plates 20 and 37, and the wooden stringers 3 are bolted to the said frames with the bolts 4. The planking 5 is spiked to the stringers 3 and is edge-bolted with the blunt bolts 36. The deck-planking $A^3$ is spiked to the stringers $A^2$, and the latter are bolted to the angles 15 with the bolts 7. The bottom planking $a^3$ is spiked to the stringers $a^2$, and the latter are bolted to the angles 18 with the bolts 38. Angles $l$ (see Fig. 4) run the whole length of the sides of the pontoon, and the reinforcing-stringers L are bolted to the same with bolts 9. The stringers 3 are framed into L, and bolts $l'$ secure the stringer L to the angle 2, the bolts 9 also securing the corner-logs J to the stringers L. The bottom stringers K are bolted to the corner-logs J with the bolts 10. The said logs J are further secured by the diagonal bolts 11, which pass through filling-pieces M, located between the frames, which latter are also secured to the stringers K with bolts 12. The top corner-logs N are supported by the stringers O, which latter are bolted to the plates 20 and angles 21 with the bolts 22. The said corner-logs N are fastened to the plates 20 and angles 23 with bolts 24, and blunt bolts 25 secure them to the top angle-irons 26. Diagonal bolts 27 tie the logs N to filling-pieces P. The effect of the diagonal bolts 11 and 27, on the bottom and top corner-logs, is to constitute them wedges, for the purpose of pressing the planking together. The vertical corner-logs T (see Fig. 9) are bolted to end frame-bulkheads 30 by means of the angles 31 32 with the bolts 33 and 34, and the side planking 5 which rabbet into the corner-logs T are bolted through and through with bolts 35 to the corner-logs T and angles 32.

It will be noticed that the structure comprises, first, essentially, a steel frame to which wooden stringers are bolted, constituting a wooden frame on the outside of the steel frame, and to the latter is spiked the planking, combining in one construction the advantages of the strength of a steel structure and the advantage of spiked planking, which can easily be renewed without disturbing the main structure of the dock.

Referring to Figs. 10 to 12, the central bulkhead is shown at F with its supporting-angles $f$ riveted to the plates $f^2$ on the top and 14 on the bottom. Angles 15 on each side are riveted to plate $f^2$, and the angles 18 are riveted to the plates 14. The angles $f$, which run from the bottom of plate 14 to the top of plate $f^2$, are riveted together and bolted to the longitudinal bulkhead F at the crossing of each frame, at the top and bottom. The longitudinal bulkhead F is stiffened by plates $f^4$ and $f^5$ on top and bottom, which are riveted to the angles 18 and 15, and the bottom plate is again stiffened by angles $f^3$, riveted to the edges of the aforesaid plate $f^4$. Diagonal braces $f^6$, which are stiffened by angles $f^7$, top and bottom, are secured to the plates $f^2$ and 14.

Referring to Figs. 13 to 17, the outrigger-frames are fastened to the end bulkheads 30 and consist of two fore-and-aft truss-frames 40, to the top of which are fastened cross-supports 41, which latter are diagonally braced from the foot of the braces 40 with the diagonal braces 42.

Having described my invention, I desire to secure by United States Letters Patent and claim—

1. A pontoon consisting of the combination of a metallic framework, wooden stringers bolted thereto constituting a wooden frame on the outside of the steel framework, planking spiked to said stringers, and means for compressing the planks against each other.

2. In a pontoon consisting of steel frames, a wooden frame bolted on the outside of the steel frames, planking spiked to the wooden frame, gutters S taking the place of some of the planking and bolted to the pontoon.

3. In a pontoon, having an outer surface of planking, logs at the corners of the pontoon and pressing against said planking, stringers K and L, behind said planking and bearing against said logs, filling-pieces bearing against said stringers K and L and bolts for pressing said planking together, and passing through said logs and said filling-pieces.

4. In a pontoon having two series of parallel angle-iron frames, connected by a bulkhead, plates $f^4$ and $f^5$ at the top and bottom of said bulkhead secured to and connecting the two series of frames, and metallic plates 20 and 37 securing together the outer ends of the members of each series of frames, and end bulkheads closing the ends of said pontoon, and outriggers riveted to said end bulkheads for the purpose described and openings in the outriggers.

5. In a dry-dock, a pontoon consisting of the combination of a series of substantially rectangular parallel metallic frames, the top, bottom and outward sides of each frame consisting of a plate, angles fastened to opposite sides of the said plate and at the edges thereof, metallic plates 20 and 37 connecting said frames together at given intervals, a second series of similar frames similarly connected together, a bulkhead running transversely to said frames, and between the two series, metallic plates $f^4$ and $f^5$ at the lower and top edges of said bulkhead, and secured to both said bulkhead and to said frames, wooden stringers bolted lengthwise of and on the outside of the angle-irons of said frames, planking spiked transversely to said stringers to form the outside surface of said pontoon, logs bearing against said planking at the corners of said pontoon, longitudinal stringers bearing against said logs, and running transversely of said frames and fastened thereto, filling-pieces bearing upon said stringers K and L, tightening-bolts passing through said logs and said filling-pieces for wedging and pressing said planking together, bolts connecting said logs to said stringers K and L, and metallic end bulkheads closing the ends of the pontoon.

Signed at New York, in the county of New York and State of New York, this 26th day of April, A. D. 1901.

GASTON A. BRONDER. [L. S.]

Witnesses:
WALTER B. PIERSON,
WILLIAM P. FRAND.